United States Patent
Murata et al.

(10) Patent No.: US 9,601,782 B2
(45) Date of Patent: Mar. 21, 2017

(54) METHOD OF PRODUCING DISPLACEMENT PLATING PRECURSOR

(75) Inventors: Hajime Murata, Nagoya (JP); Tomoyuki Nagai, Nissin (JP); Yu Morimoto, Nagoya (JP); Toshihiro Ikai, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 825 days.

(21) Appl. No.: 13/984,052

(22) PCT Filed: Feb. 13, 2012

(86) PCT No.: PCT/IB2012/000254
§ 371 (c)(1),
(2), (4) Date: Aug. 7, 2013

(87) PCT Pub. No.: WO2012/110875
PCT Pub. Date: Aug. 23, 2012

(65) Prior Publication Data
US 2013/0319871 A1 Dec. 5, 2013

(30) Foreign Application Priority Data
Feb. 17, 2011 (JP) ................. 2011-032554

(51) Int. Cl.
  C23C 18/54 (2006.01)
  H01M 4/88 (2006.01)
  (Continued)

(52) U.S. Cl.
  CPC .......... *H01M 4/8892* (2013.01); *C23C 18/38* (2013.01); *C23C 18/54* (2013.01); *C25D 3/38* (2013.01);
  (Continued)

(58) Field of Classification Search
  CPC ................. C25D 7/006; C23C 18/54
  See application file for complete search history.

(56) References Cited

U.S. PATENT DOCUMENTS 8,231,773 B2 * 7/2012 Zhang ................ C25B 9/16
 204/260
2007/0026292 A1 2/2007 Adzic et al.
(Continued)

FOREIGN PATENT DOCUMENTS

| CN | 101379639 | 3/2009 |
|----|-----------|--------|
| JP | 2007-141477 | 6/2007 |

(Continued)

OTHER PUBLICATIONS

J. Zhang et al., "Stabilization of Platinum Oxygen-Reduction Electrocatalysts Using Gold Clusters," Science, vol. 315, pp. 220-222, (Jan. 12, 2007).

(Continued)

*Primary Examiner* — Bryan D. Ripa
(74) *Attorney, Agent, or Firm* — Finnegan, Henderson, Farabow, Garrett & Dunner, LLP

(57) ABSTRACT

A method of producing a displacement plating precursor, including a deposition step of depositing a Cu layer on a surface of a core particle formed of Pt or a Pt alloy by contacting a Cu ion-containing acidic aqueous solution with at least a portion of a Cu electrode, and contacting the Cu electrode with the core particle or with a composite, in which the core particle is supported on an electroconductive support, within the acidic aqueous solution or outside the acidic aqueous solution, and moreover contacting the core particle with the acidic aqueous solution under an inert gas atmosphere.

6 Claims, 4 Drawing Sheets

(51) Int. Cl.
| | |
|---|---|
| C23C 18/38 | (2006.01) |
| H01M 4/90 | (2006.01) |
| H01M 4/92 | (2006.01) |
| C25D 7/00 | (2006.01) |
| C25D 3/38 | (2006.01) |
| C25D 17/12 | (2006.01) |
| C25D 3/58 | (2006.01) |

(52) U.S. Cl.
CPC .............. *C25D 7/006* (2013.01); *C25D 17/12* (2013.01); *H01M 4/8853* (2013.01); *H01M 4/9041* (2013.01); *H01M 4/92* (2013.01); *C25D 3/58* (2013.01); *Y02E 60/50* (2013.01)

(56) References Cited

U.S. PATENT DOCUMENTS

| | | | |
|---|---|---|---|
| 2007/0111085 A1 | 5/2007 | Sugimasa et al. | |
| 2008/0011125 A1 | 1/2008 | Shirata et al. | |
| 2010/0116668 A1* | 5/2010 | Landau | B82Y 30/00 205/50 |
| 2010/0216632 A1* | 8/2010 | Adzic | H01M 4/8657 502/101 |
| 2012/0245017 A1* | 9/2012 | Adzic | C25D 5/20 502/1 |
| 2013/0022899 A1* | 1/2013 | Arai | C23C 18/31 429/524 |
| 2013/0035226 A1* | 2/2013 | Mizutani | H01M 4/921 502/101 |

FOREIGN PATENT DOCUMENTS

| | | |
|---|---|---|
| JP | 2009-510705 | 3/2009 |
| WO | WO 2008/033113 A2 | 3/2008 |

OTHER PUBLICATIONS

M. Vukmirovic et al., "Platinum Monolayer Electrocatalysts for Oxygen Reduction", Electrochemica Acta, vol. 52, pp. 2257-2263 (2007).

L. Qu et al., "Shape/Size-Controlled Syntheses of Metal Nanoparticles for Site-Selective Modification of Carbon Nanotubes," J. Am. Chem. Soc., vol. 128, pp. 5523-5532 (2006).

S. Zhou et al., "Pt—Cu Core-Shell and Alloy Nanoparticles for Heterogeneous $NO_x$ Reduction: Anomalous Stability and Reactivity of a Core-Shell Nanostructure," Angew. Chem. Int. Ed., vol. 44, pp. 4539-4543 (2005).

Jia X. Wang et al., "Oxygen Reduction on Well-Defined Core-Shell Nanocatalysts: Particle Size, Facet, and Pt Shell Thickness Effects," JACS Articles, XP55286001, p. 17300, fig. 1, Brookhaven National Laboratory, Upton, New York 11973, and Hitachi High Technologies America, Inc., Pleasanton, California 94588. Published on the Web Nov. 9, 2009.

* cited by examiner

F I G . 1
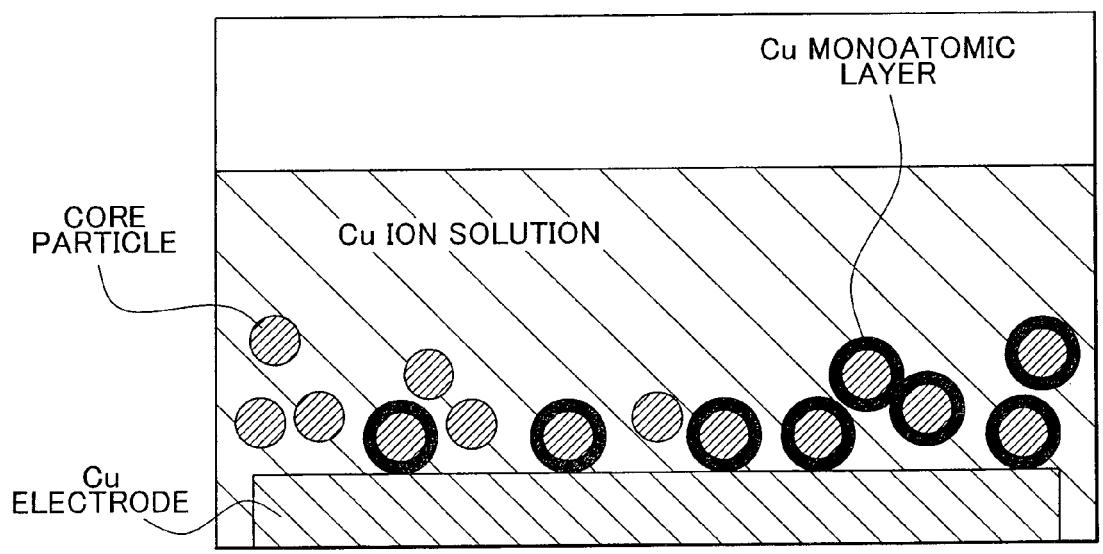

REACTION UPON CONTACT $Pt + Cu^{2+} + 2e^- \rightarrow Cu - Pt$ $Cu \rightarrow Cu^{2+} + 2e^-$

METHOD OF PRODUCING DISPLACEMENT PLATING PRECURSOR

CROSS-REFERENCE TO RELATED APPLICATIONS

This application is a national phase application of International Application No. PCT/IB2012/000254, filed Feb. 13, 2012, and claims the priority of Japanese Application No. 2011-032554, filed Feb. 17, 2011, the content of both of which is incorporated herein by reference.

BACKGROUND OF THE INVENTION

1. Field of the Invention

The invention relates to a method of producing a displacement plating precursor and more particularly relates to a method of producing a displacement plating precursor. This method enables the production of core-shell particles in which the surface of a core particle formed of Pt or a Pt alloy is coated by a monoatomic layer of Cu, without using an external power source.

2. Description of Related Art

In general, a surface treatment, e.g., plating, physical vapor deposition (PVD), chemical vapor deposition (CVD), and so forth, is frequently carried out by covering the surface of a substrate with a different type of material in order to modify only the properties of the substrate surface while leaving the properties of the substrate intact. On the other hand, this type of surface treatment is also employed in order to lower the amount of use of an expensive material or improve its utilization rate or prevent a deterioration in its properties. For example, a catalyst (Pt-loaded carbon (Pt/C)) in which Pt or a Pt alloy having a particle diameter of several nanometers is supported on a carbon particle having a high specific surface area is generally used as an electrocatalyst for fuel cell applications. Since only the atoms residing in the vicinity of the surface of the Pt particle exercise a catalytic function, a problem with this PVC catalyst is the low utilization rate of the expensive Pt. As a consequence, an art has been proposed in which the interior of the particle is replaced by a different material and the use of Pt is limited to several atomic layers from the particle surface. Conventionally, the Pt particles grow larger and cell performance declines when Pt/C is used in a fuel cell environment. Due to this, an art has been proposed in which Pt particle enlargement is inhibited by forming a thin Au layer on the surface of the Pt particle.

Various proposals have already been made in relation to this surface treatment art. For example, the following method for producing an oxygen-reducing electrocatalyst has been disclosed in Published Japanese Translation of PCT application No. 2009-510705 (JP-A-2009-510705): (1) placing approximately 3 to 10 nm Pt nanoparticles on a suitable electrode and immersing this electrode in an approximately 50 $CuSO_4$/0.10 M $H_2SO_4$ aqueous solution in a nitrogen atmosphere; (2) depositing a monoatomic layer of copper on the Pt nanoparticles by applying a suitable reducing potential to the electrode; (3) rinsing the electrode containing copper-coated Pt nanoparticles with purified water to remove the Cu ion present in the solution; (4) displacing the copper monoatomic layer with a gold monoatomic layer by immersing the electrode containing copper-coated Pt nanoparticles for 1 to 2 minutes in an approximately 1.0 mM aqueous $HAuCl_4$ solution; and (5) rinsing the electrode again. It is stated in this publication that the Pt can be protected from oxidation and dissolution by coating the Pt nanoparticle surface with the Au monoatomic layer.

In the method of producing an oxygen-reducing electrocatalyst disclosed by J. Zhang et al., *Science*, 315 (2007) pp. 220-222; a Cu monoatomic layer is coated on a Pt surface by an underpotential deposition (URD) technique and the Cu monoatomic layer on the Pt is then galvanically displaced by Au. It is stated in this publication that (1) this method can provide an Au/Pt/C catalyst in which Au clusters are deposited on the Pt catalyst (Pt nanoparticles supported on carbon); and (2) when the Pt nanoparticles are modified by the Au clusters, there is almost no change in the activity and surface area of the Au-modified Pt even after the application of 30,000 0.6-to-1.1 V potential cycles under an oxidizing atmosphere.

In the method of producing a Pt monoatomic layer electrocatalyst disclosed by M. B. Vukmirovic et al., *Electrochimica Acta*, 52(2007) pp. 2257-2263, a Cu monoatomic layer is formed using a UPD technique on the surface of a Pd(111) single crystal or on the surface of a Pd nanoparticle and the Cu monoatomic layer is galvanically displaced by Pt. It is stated in this publication that the oxygen reduction reaction activity of the $Pt_{ML}$/Pd/C is higher than that of Pt/C.

UPD is a phenomenon in which a metal ion in solution deposits onto a substrate metal different from the metal ion at a more noble potential (a potential at which deposition of the metal ion does not ordinarily occur) than the thermodynamic equilibrium potential for the metal ion. UPD is characterized by the ability to coat a substrate metal surface with a monoatomic layer of a different metal, but the metal combinations that support UPD are limited since it occurs when there is substantial interaction between the different metals. The deposition of a monoatomic metal layer by UPD is ordinarily carried out by immersing a working electrode (WE) to which the substrate metal is connected, a counterelectrode (CE), and a reference electrode (RE) in a solution that contains the metal ion and holding the WE at a prescribed potential using an external power source.

For example, when a Cu monoatomic layer is deposited on the surface of a Pt nanoparticle (or a Pt nanoparticle supported on a support such as carbon) using the UPD technique, the Pt nanoparticle must be coated and immobilized on the surface of the WE in order to hold the Pt nanoparticle at the prescribed potential using an external power source. However, this coating procedure has a high process cost and a large amount of time is required for the process. In addition, while being suitable for synthesis at the µg level, it is not well adapted for mass production.

Moreover, when the Pt nanoparticles immobilized on the WE are held at a prescribed potential using an external power source, an oxidation reaction occurs at the CE at the same time that the Cu ion reduction reaction occurs at the WE. For example, oxygen gas is produced at the CE when the metal ion-containing solution is an aqueous sulfuric acid solution. When the generated oxygen comes into contact with the Pt nanoparticles in this case, the potential of the Pt nanoparticles increases and detachment of the deposited Cu monoatomic layer can be a problem. In order, on the other hand, to prevent detachment of the Cu monoatomic layer, it is then necessary to design the CE so as to prevent the generated gas from influencing the WE, while maintaining ionic conduction to the WE. However, it is considered to be quite difficult to design a reaction vessel that solves these problems and at the same time is well adapted for mass production.

SUMMARY OF THE INVENTION

The invention provides a method of producing a displacement plating precursor that can form a Cu monoatomic layer on the surface of a Pt particle or Pt alloy particle and that can do so without using an external power source. The invention also provides a method of producing a displacement precursor that is well adapted for mass production and that blocks the influence of the oxidation reaction occurring at the CE.

The method of producing a displacement plating precursor according to a first aspect of the invention is provided with a deposition step of depositing a Cu layer on a surface of a core particle formed of Pt or a Pt alloy by contacting a Cu ion-containing acidic aqueous solution with at least a portion of a Cu electrode, and contacting the Cu electrode with the core particle or with a composite, in which the core particle is supported on an electroconductive support, within the acidic aqueous solution or outside the acidic aqueous solution, and moreover contacting the core particle with the acidic aqueous solution under an inert gas atmosphere.

When at least a portion of a Cu electrode is immersed in a Cu ion-containing acidic aqueous solution in an equilibrium state, the potential of the Cu electrode becomes equal to the standard electrode potential (approximately 0.35 V) for Cu regardless of location. When this Cu electrode is brought into contact with the core particle or the composite, the core particle takes on the same potential as the potential of the Cu electrode regardless of whether the position of contact is or is not in the acidic aqueous solution. When the core particle is brought into contact under these conditions with the acidic aqueous solution, UPD occurs almost instantaneously and the surface of the core particle is coated with a Cu monoatomic layer. Since the Cu electrode in contact with the acidic aqueous solution functions as a 0.35 V power source, the method according to the invention does not require the use of an external power source or a RE in order to produce UPD. In addition, the method according to the invention does not require coating immobilization of the core particles on the WE and thus is also well adapted for mass production. Furthermore, the Cu electrode also functions as a CE, but only a Cu dissolution reaction ($Cu \rightarrow Cu^{2+} 2e^-$)—which is not accompanied by oxygen generation—occurs as the oxidation reaction at the Cu electrode surface. As a consequence, there is little risk that the Cu monoatomic layer, once deposited, will undergo detachment.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a schematic diagram for describing the method according to an embodiment of the invention;

DETAILED DESCRIPTION OF EMBODIMENTS

Figure 2:
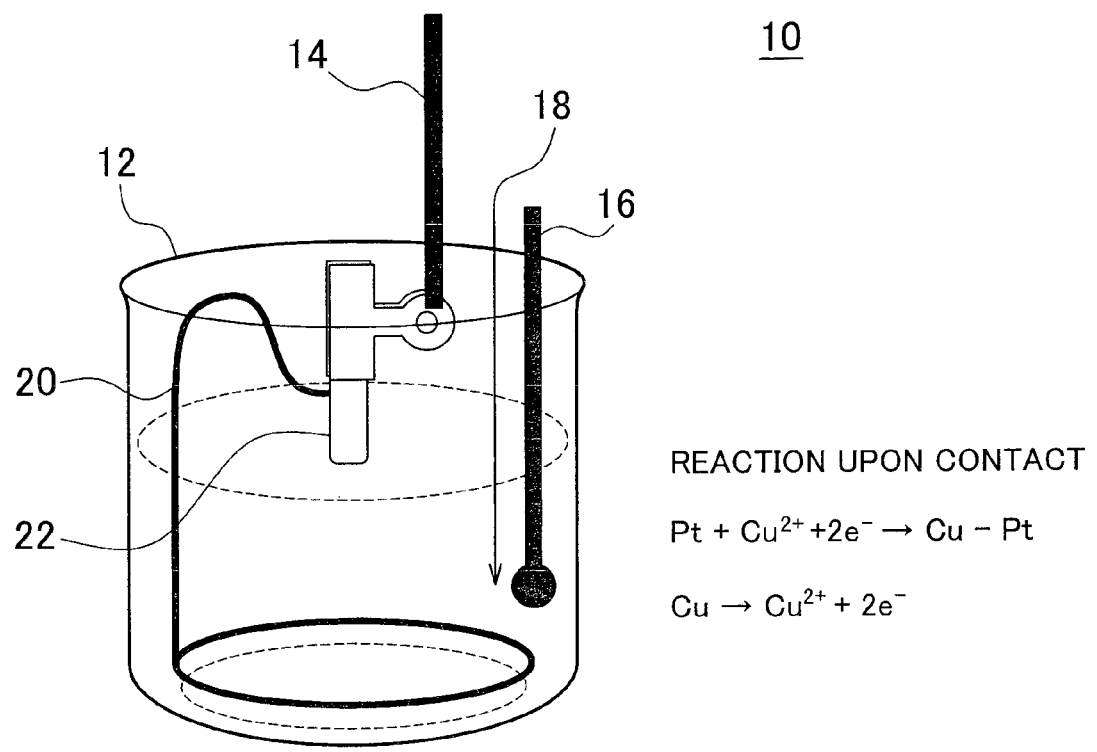
FIG. 2 is a schematic structural diagram of a test apparatus.

An embodiment of the invention is described in detail below.

1. The Method of Producing a Displacement Plating Precursor

The method of producing a displacement plating precursor according to the embodiment of the invention is provided with a deposition step of depositing a Cu layer on the surface of a core particle formed of Pt or a Pt alloy by (a) contacting a Cu ion-containing acidic aqueous solution with at least a portion of a Cu electrode, (b) contacting the Cu electrode with the core particle or with a composite in which the core particle is supported on an electroconductive support, wherein this contact is effected within the aforementioned acidic aqueous solution or outside the aforementioned acidic aqueous solution, and (c) contacting the core particle with the acidic aqueous solution under an inert gas atmosphere.

1.1. The Contact Between the Acidic Aqueous Solution and the Cu Electrode 1.1.1. The Acidic Aqueous Solution The "acidic aqueous solution" denotes an acidic aqueous solution that contains the Cu ion. The acidic aqueous solution may contain a component or components other than the Cu ion, acid, and water to the extent that UPD remains possible and the Pt or Pt alloy is not poisoned. This other component can be exemplified by the anion originating from a soluble Cu salt and by weakly reducing organic solvents (for example, a higher alcohol). In order to remove dissolved oxygen, the acidic aqueous solution is preferably thoroughly bubbled with an inert gas (for example, $N_2$ or Ar) before the reaction or during the reaction.

The Cu ion-containing acidic aqueous solution is obtained by dissolving a soluble Cu salt in an acidic aqueous solution. This soluble Cu salt can be exemplified by $CuSO_4$, $CuCl_2$, $Cu_2(CH_3COO)_4$, $Cu(NO_3)_2$, and so forth.

The Cu ion concentration in the acidic aqueous solution is not particularly limited, and the optimal concentration may be selected in conformity with the particular objective. In this embodiment, Cu elutes from the Cu electrode in the amount that is deposited by UPD. As a consequence, the reaction goes forward even when the Cu ion concentration is at the μM level. However, the reaction must progress rapidly in the industrial context, and for this reason the Cu ion concentration is preferably at least 1 mM. However, solute precipitation readily occurs when the Cu ion concentration becomes excessive, and the Cu ion is therefore preferably less than or equal to the saturation concentration. The Cu ion concentration is more preferably less than or equal to 90% of the saturation concentration.

The acid present in the aqueous solution is desirably an acid that can dissolve Cu. Such an acid can be specifically exemplified by nitric acid, sulfuric acid, perchloric acid, phosphoric acid, hydrochloric acid, boric acid, and so forth. The combination of Cu salt and acid is not particularly limited, and any combination can be selected in conformity with the particular objective.

As a general matter, it is difficult to bring the Cu electrode to the prescribed potential when the pH in the acidic aqueous solution is too high. In addition, the reaction rate declines as the pH of the acidic aqueous solution increases. Accordingly, the pH of the acidic aqueous solution is preferably not more than 4. On the other hand, when the treatment target is a composite, the surface of the support (for example, carbon) may undergo oxidation when the pH is too low. Accordingly, the pH of the acidic aqueous solution is preferably at least 1.

1.1.2. The Cu Electrode

The "Cu electrode" is formed of Cu or a Cu alloy at least at its surface and is capable of ionic conduction directly or indirectly among the Cu electrode-core particle-acidic aqueous solution. The Cu electrode is desirably Cu or a Cu alloy at least at its surface, but need not be Cu or Cu alloy in its entirety.

The Cu electrode is preferably high-purity Cu; however, the Cu electrode may be a low-purity Cu that contains unavoidable impurities or may be a Cu alloy that contains an alloying element or elements, but only insofar as the potential of the core particle can be brought to the Cu standard electrode potential (approximately 0.35 V). For example, a Cu alloy containing a metal with a redox potential lower than Cu (for example, Zn or Sn) cannot be used for the Cu electrode. This is due to the preferential dissolution of the metal baser than Cu (or because during dissolution the electrode assumes a potential lower than the standard electrode potential of Cu). On the other hand, a Cu alloy containing a metal nobler than Cu (for example, Pt, Ag, Au, Pd, or Ir) can be used as the Cu electrode. When a Cu alloy is used as the Cu electrode, the Cu dissolution rate slows as the Cu content declines. In addition, as Cu dissolution progresses, the proportion of Cu at the electrode surface declines and contact between the Cu and the core particle is made more difficult. Accordingly, larger Cu contents in the Cu electrode are more desirable when a Cu alloy is used as the Cu electrode.

In specific terms, the Cu electrode may be, for example, (1) a particulate, sheet or plate, bar, fine wire, mesh, or lump formed of solid Cu or Cu alloy or (2) a vessel having an interior wall surface coated with Cu or a Cu alloy.

1.1.3. The Method of Contact

The method of bringing the acidic aqueous solution into contact with the Cu electrode is desirably a method that can bring the potential of the Cu electrode to the standard electrode potential of Cu by effecting contact between the acidic aqueous solution and at least a portion of the Cu electrode. In this case, the acidic aqueous solution and the Cu electrode are desirably in direct contact, while the Cu electrode and core particle or composite need not necessarily be in direct contact with each other.

The optimal specific contact method may be selected in conformity with the shape and size of the Cu electrode, the state or condition of the core particle or composite in the acidic aqueous solution, and so forth. For example, when the Cu electrode is a powder, the powder may simply be dispersed in the acidic aqueous solution. When the Cu electrode is a plate or sheet, bar, fine wire, or mesh, the plate etc. may be immersed in its entirety in the acidic aqueous solution or only one end thereof may be immersed in the acidic aqueous solution. When the Cu electrode is a lump, all or a portion of the lump may be immersed in the acidic aqueous solution or the acidic aqueous solution may be dripped or sprayed on the surface of the lump. When the Cu electrode is a Cu layer that has been formed on the interior wall surface of a vessel, the acidic aqueous solution may simply be introduced into the vessel.

1.2. The Contact Between the Cu Electrode and the Core Particle or Composite 1.2.1. The Core Particle The 'core particle' denotes a particle formed of Pt or a Pt alloy. This "Pt alloy" denotes an alloy having a Pt content of at least 50 at %. The Pt alloy can be exemplified by PtCo alloys, PtCu alloys, PtFe alloys, PtSn alloys, PtRu alloys, PtNi alloys, PtIr alloys, PtAu alloys, and so forth. The "composite" denotes a composite in which the core particle is supported on an electroconductive support. The electroconductive support may be a powder or may take the form of a plate or sheet, bar, mesh, and so forth. The electroconductive support can be exemplified by carbon, titanium oxide ($Ti_4O_7$), molybdenum oxide, tantalum oxide, and so forth.

The size of the core particle is not particularly limited and may be freely selected in conformity with the particular objective. For example, a core particle diameter of 2 to 10 nm is preferred when the displacement plating precursor yielded by the method according to the invention is to be used for an electrocatalyst for fuel cell applications.

1.2.2. The Method of Contact

Contact between the Cu electrode and the core particle or composite is carried out in order to bring the core particle to the same potential (standard electrode potential of Cu) as the Cu electrode. Due to this, the two need not necessarily be brought into contact in the acidic aqueous solution, and contact may be performed outside the acidic aqueous solution. In addition, since UPD occurs almost instantaneously, contact between the Cu electrode and core particle or composite does not always have to be performed, and contact may be performed for just the very brief period of time until the completion of UPD.

The optimal specific contact method may be selected in conformity with the shape and size of the Cu electrode, the state or condition of the core particle or composite in the acidic aqueous solution, and so forth. For example, when the composite and the Cu electrode are both powders, both may be dispersed in the acidic aqueous solution and the dispersion may be stirred. When the composite is a powder and the Cu electrode is a bar, the Cu electrode may be immersed in a dispersion prepared by dispersing the composite in the acidic aqueous solution and the dispersion may be stirred. In addition, when a powder-form composite is immobilized on the surface of an electroconductive substrate (e.g., glassy carbon) and the Cu electrode is a fine wire, the substrate may be connected to one end of the fine wire.

1.3. The Contact Between the Core Particle or Composite and the Acidic Aqueous Solution A Cu layer can be deposited on the surface of the core particle when the core particle is brought into contact with the acidic aqueous solution while contact is being effected between the acidic aqueous solution-Cu electrode and between the Cu electrode-core particle or composite. When in this case oxygen is present in the atmosphere, the core particle comes into contact with oxygen and the potential of the core particle is increased. The Cu layer deposited on the core particle surface undergoes detachment when the potential of the core particle is higher than the standard electrode potential of Cu. Accordingly, the contact between the core particle and acidic aqueous solution must be carried out under an inert gas atmosphere. This inert gas can be exemplified by $N_2$, As, and so forth. Here, "contact under an inert gas atmosphere" means that contact between the acidic aqueous solution-core particle or composite is performed in a state in which the core particle does not come into contact with an oxygen-containing gas.

1.4. Specific Examples of the Deposition Step

The following methods are specific examples of the method of bringing about contact among the core particle or composite-acidic aqueous solution-Cu electrode under an inert gas atmosphere.

1.4.1. Specific Example 1

In a first method, a solid that functions as the Cu electrode and that is formed of Cu or a Cu alloy, the core particles or powder-form composite, and the acidic aqueous solution are introduced into a vessel and the acidic aqueous solution is stirred. The Cu electrode may be a powder or may be a plate or sheet, bar, fine wire, mesh, or lump. Stirring of the acidic aqueous solution may be performed using, for example, a stirrer. When the Cu electrode includes, for example, a sheet, plate, or bar, the acidic aqueous solution may be stirred using the Cu electrode. The vessel containing the acidic aqueous solution is preferably located in an inert gas atmosphere (for example, a glove box) in order to prevent contact between oxygen and the core particles at the surface of the acidic aqueous solution. When the acidic aqueous solution is stirred, the Cu electrode comes into contact with the core particles or composite in the acidic aqueous solution. The frequency of contact between the Cu electrode and core particles or composite can be adjusted through the amount of dispersed powder and the stirring rate.

1.4.2. Specific Example 2

In a second method, a Cu layer or Cu alloy layer that functions as the Cu electrode is formed on at least the interior wall surface of a vessel; the acidic aqueous solution and the core particles or powder-form composite are introduced into the vessel; and the acidic aqueous solution is stirred. In this case, the entire vessel may be formed of Cu or a Cu alloy or only its surface may include Cu or a Cu alloy. The vessel containing the acidic aqueous solution is preferably located in an inert gas atmosphere in order to prevent contact between oxygen and the core particles at the surface of the acidic aqueous solution. When the acidic aqueous solution is stirred, the composite or core particles come into contact with the interior wall surface of the vessel that functions as the Cu electrode. The frequency of contact between the Cu electrode and core particles or composite can be adjusted through the amount of dispersed powder and the stirring rate.

1.4.3. Specific Example 3

In a third method, a solid that functions as the Cu electrode and that is formed of Cu or a Cu alloy is filled into a vessel that is open at both ends and a dispersion prepared by dispersing the core particles or the powder-form composite in the acidic aqueous solution is flowed through the interior of this vessel. The shape of the Cu electrode that is filled into the vessel is not particularly limited, but should enable flowthrough of the dispersion. The Cu electrode, for example, may be any of the following: a powder with a course granulometry, a plate or sheet, a bar, a mesh, or a lump. The flow path for the dispersion is preferably under an inert gas atmosphere. When the dispersion is passed through from one end to the other end of the vessel filled with the solid formed of Cu or a Cu alloy, the Cu electrode comes into contact with the core particles or composite in the dispersion during the flowthrough step. The frequency of contact between the Cu electrode and the core particles or the composite can be adjusted using, for example, the amount of solid formed of Cu or Cu alloy filled into the vessel, the amount of the powder in the dispersion, the flowthrough velocity for the dispersion, and so forth.

1.4.4. Specific Example 4

In a fourth method, a dispersion prepared by dispersing the core particles or powder-form composite in the acidic aqueous solution is sprayed onto the surface of a solid that functions as the Cu electrode and is formed of Cu or a Cu alloy. The shape of the Cu electrode is not particularly limited and it may be a powder, sheet or plate, bar, fine wire, mesh, or lump. Spraying is preferably performed in an inert gas atmosphere. When the dispersion is sprayed on the surface of the Cu electrode, the core particles or composite come into contact with the Cu electrode at the Cu electrode/dispersion interface. The frequency of contact between the Cu electrode and the core particles or composite can be adjusted using, for example, the amount of powder in the dispersion, the amount of the spray, and the surface area of the Cu electrode.

1.4.5. Other Specific Examples

As an example of another method, an electroconductive substrate may be connected to one end of a Cu electrode having a fine wire form; the core particle or composite may be immobilized on the surface of the electroconductive substrate; the fine wire may be bent into a U-shape; and one end of the fine wire and the electroconductive substrate may be immersed at the same time in the acidic aqueous solution.

1.5. Applications

The displacement plating precursor provided by the method according to this embodiment is a Pt or Pt alloy particle having a Cu monoatomic layer coated on its surface. The surface Cu monoatomic layer can be substituted by another material (for example, Au) using a galvanic displacement technique. The Au-coated Pt (or Pt alloy) particle can be used as a catalyst in various electrochemical devices, for example, fuel cells. In addition, the Au-coated Pt (or Pt alloy) particle can be used in, for example, various sensors (for example, alcohol sensors and gas sensors).

2. Function of the Method of Producing a Displacement Plating Precursor

In a conventional UPD technique using an external power source, deposition of a Cu monoatomic layer on the surface of a Pt nanoparticle requires the immobilization of the Pt nanoparticle on the surface of a WE. This method, however, is ill adapted for mass production. A method could also be contemplated in which Pt nanoparticles are dispersed in an aqueous solution; a dimensionally stable electrode (the WE having a potential controlled by an external power source, a CE, and a RE are immersed in this dispersion; and the dispersion is stirred. The Pt nanoparticles can be brought into contact with the potential-controlled dimensionally stable electrode when the dispersion is stirred. However, oxygen gas is generated from the CE in this method, creating the problem of facile detachment of the Cu monoatomic layer. In addition, the use of the dispersion can cause contamination of the RE, or the flow path to the RB may be susceptible to clogging by the Pt nanoparticles. This results in a strong possibility that the long-term stability of potential control will be impaired.

In contrast to this, the Cu ion dissolves when solid Cu is immersed in the acidic aqueous solution. Cu dissolution and deposition of the Cu ion occur at the solid Cu surface in the acidic aqueous solution in which Cu ion is present. When this reaches equilibrium, the potential of the solid Cu surface at this time is approximately 0.35 V (standard hydrogen electrode (SHE) reference). When Pt (possibly across an interposed electronic conductor such as carbon) is brought into contact with this solid Cu, this Pt assumes a potential of 0.35 V. The entire electronic conductor will assume this potential even if just an edge or end of the electronic conductor is in contact with the solid Cu. At this Cu equilibrium potential, a phenomenon (UPD) is produced, which could also be called ultraplating, whereby a coating formed of a Cu monoatomic layer is deposited on the Pt or Pd. The invention employs this principle.

Thus, when, as shown in FIG. 1, at least a portion of a Cu electrode is immersed in a Cu ion-containing acidic aqueous solution at equilibrium (the Cu ion solution), the potential of the Cu electrode becomes equal to the standard electrode potential of Cu (approximately 0.35 V) regardless of the location. When this Cu electrode is brought into contact with a core particle or composite, the core particle assumes the same potential as the Cu electrode regardless of whether or not the location of contact is in the acidic aqueous solution. When the core particle is brought into contact under these conditions with the acidic aqueous solution, UPD occurs almost instantaneously and the surface of the core particle is coated with a Cu monatomic layer. In addition, once the surface of the core particle has been coated with a Cu monatomic layer by UPD, the UPD state is not destroyed even when the core particle is separated from the Cu electrode.

Since the Cu electrode in contact with the acidic aqueous solution operates as a 0.35 V power source, the method according to this embodiment does not require the use of an external power source or a RE to produce UPD. In addition, coating immobilization of the core particle on the WE is not necessary, and the method according to this embodiment is thus also well adapted for mass production. Furthermore, since the Cu electrode also functions as the CE, only a Cu dissolution reaction (Cu→$Cu^{2+}$+$2e^-$) occurs as the oxidation reaction at the surface of the Cu electrode, and this method is thus not accompanied by the generation of oxygen. Due to this, there is little risk that the Cu monoatomic layer will detach once it has been deposited.

EXAMPLE 1

1. Sample Production

Commercially available Pt/C was immobilized on the surface of a substrate. Glassy carbon was used for the substrate, immobilization of the Pt/C was carried out by dispersing the PVC in a solvent to make an ink; coating the ink on the surface of the substrate; and drying off the solvent.

2. The Test Method

A schematic structural diagram of the test apparatus is shown in FIG. 2. As shown in FIG. 2, the test apparatus 10 is provided with a vessel 12, a WE 14, a CE (CE) 16, a RE 18, and a Cu electrode 20. The vessel 12 serves to hold the cleaning solution for CV cleaning of the Pt particle surface or to hold the acidic aqueous solution for deposition of a Cu monatomic layer on the Pt particle surface. In this example, an aqueous 0.1 M $HClO_4$ solution was used for the cleaning solution. A 50 mM $CuSO_4$+0.1 M $H_2SO_4$ aqueous solution was used for the acidic aqueous solution for UDP.

The substrate 22 bearing the immobilized Pt/C is connected to the end of the WE 14. The WE 14, the CE 16, and the RE 18 are connected to an external power source (not shown). A Cu electrode 20 in the form of a fine wire is immersed in the acidic aqueous solution in the vessel 12. In this example, the external power source was used only in the CV cleaning of the Pt particle surface and in measurement of the current-voltage characteristics. UPD, on the other hand, was carried out by immersing the substrate 22 connected to the WE 14 into the acidic aqueous solution for UPD and bringing the substrate 22 into contact with the Cu electrode 20. The WE 14 and the RE 18 were used at this time only for measurement of the potential. When the Cu electrode 20 and the substrate 22 are brought into contact, the reaction with equation (1) below occurs at the Pt particle surface. At the same time as this, the reaction with equation (2) below occurs at the surface of the Cu electrode 20.

Pt+$Cu^{2+}$+$2e^-$→Cu—Pt (1)

Cu→$Cu^{2+}$+$2e^-$ (2)

Figure 3:
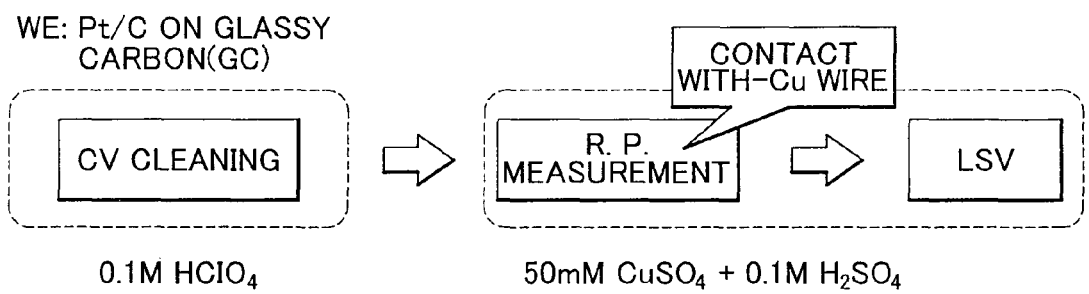
FIG. 3 is a block diagram of the test procedure using the test apparatus shown in FIG. 2.

FIG. 3 shows a block diagram of the test procedure using the test apparatus 10 shown in FIG. 2. CV cleaning was first performed by introducing the cleaning solution into the vessel 12 and immersing the substrate 22 bearing the immobilized Pt/C in the cleaning solution. The CV cleaning conditions were as follows: potential interval: 0.05 to 1.2 V, scan rate: 50 mV/s, and number of cycles: 50. The acidic aqueous solution for UPD was then introduced into the vessel 12 and the CV-cleaned substrate 22 was immersed in the acidic aqueous solution. One end of the Cu electrode 20 immersed in the acidic aqueous solution was brought into contact with the substrate 22 and the rest potential (R. P.) was measured. After the R. P. measurement, LSV (1st cycle) and CV (2nd cycle) on the Cu were also carried out. The LSV conditions were as follows: potential interval: 0.35 to 1.2 V, scan rate: 50 mV/s, and scan time: 17 s. The CV conditions were as follows: potential interval: 0.35 to 1.2 V, scan rate; 50 mV/s, and scan time: 34 s.

3. Results 3.1. Measurement of the R. P.

Figure 4:
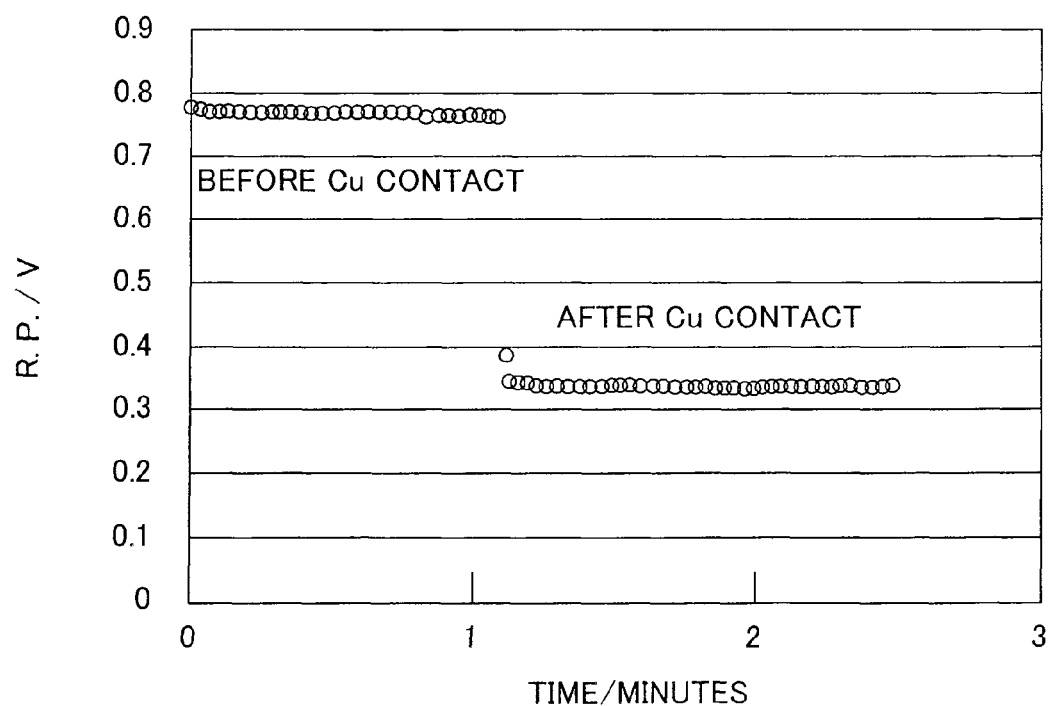
FIG. 4 is a diagram that shows the results of measurement of the RE (R, P.) before and after contact between the substrate and Cu electrode.

FIG. 4 shows the results of measurement of the R. P. pre- and post-contact between the substrate 22 and the Cu electrode 20. It may be understood from FIG. 4 that when the substrate 22 and the Cu electrode 20 are brought into contact, the potential of the substrate 22 becomes approximately 0.35 V (RE potential of Cu) almost instantaneously.

3.2. The LSV and CV

Figure 5:
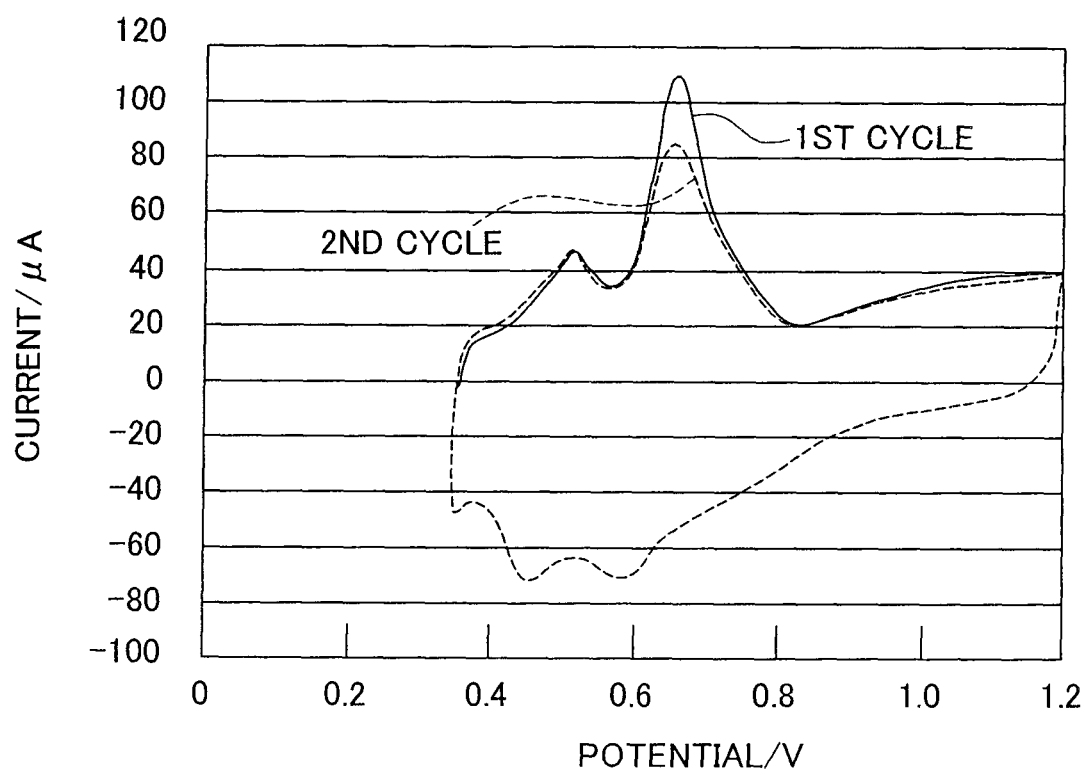
FIG. 5 is a diagram that shows the results of LSV (1st cycle) and cyclic voltammetry (CV: 2nd cycle) for Cu.

The LSV (1st cycle) and CV (2nd cycle) of the Cu are shown in FIG. 5. The following may be understood from FIG. 5. (1) With reference to the LSV, the current rose when the potential was increased from 0.35 V. This is thought to show the following: (a) UPD was produced just by contact between the Cu electrode 20 and the substrate 22; and (b) the Cu monoatomic layer on the Pt particle surface that was formed during contact with the Cu electrode 20 was detached by the increase in the potential. (2) With reference to the CV, the current declined when the potential was dropped from 1.2 to 0.35 V. This is thought to show that the Pt particle surface was coated with a Cu monoatomic layer by potential control using an external power source. (3) With reference to the CV the CV during the rise was almost the same as the LSV when the potential was re-increased from 0.35 V. This is thought to show that contact between the substrate 22 and the Cu electrode 20 produced almost the same UPD as UPD using an external power source.

Embodiments of the invention have been described in detail hereabove, but the invention is in no way limited to the embodiments considered above, and various modifications will be possible within a range that does not deviate from the essential features of the invention.

The method according to the invention for producing a displacement plating precursor can be used as a method of producing a precursor for producing various catalysts that have a surface coated with a dissimilar metal.

The invention claimed is:

1. A method of producing a displacement plating precursor, comprising:
   a deposition step of depositing a Cu layer on a surface of a core particle formed of Pt or a Pt alloy, without the use of an external power source, by
   contacting a Cu ion-containing acidic aqueous solution with at least a portion of a Cu electrode, and
   contacting the Cu electrode with the core particle or with a composite, in which the core particle is supported on an electroconductive support, within the acidic aqueous solution or outside the acidic aqueous solution, and moreover contacting the core particle with the acidic aqueous solution under an inert gas atmosphere.

2. The method of producing a displacement plating precursor according to claim 1, wherein the core particle has a diameter of 2 to 10 nm.

3. The method of producing a displacement plating precursor according to claim 1, wherein a Cu ion concentration in the acidic aqueous solution is from at least 1 mM to not more than a saturation concentration.

4. The method of producing a displacement plating precursor according to claim 3, wherein the Cu ion concentration in the acidic aqueous solution is less than or equal to 90% of the saturation concentration.

5. The method of producing a displacement plating precursor according to claim 1, wherein pH of the acidic aqueous solution is from at least 1 to not more than 4.

6. The method of producing a displacement plating precursor according to claim 1, wherein the deposition step includes deposition of the Cu layer on the surface of the core particle by using any of (a) a method in which the acidic aqueous solution, the core particles or a powder of the composite, and a solid that functions as the Cu electrode and that is formed of Cu or a Cu alloy are introduced into a vessel and the acidic aqueous solution is stirred; (b) a method in which a Cu layer or a Cu alloy layer that functions as the Cu electrode is formed on at least an interior wall surface of a vessel, the acidic aqueous solution and the core particles or a powder of the composite are introduced into this vessel, and the acidic aqueous solution is stirred; (c) a method in which a solid that functions as the Cu electrode and that is formed of Cu or a Cu alloy is filled into a vessel that is open at both ends and a dispersion prepared by dispersing the core particles or a powder of the composite in the acidic aqueous solution is flowed through the interior of this vessel; and (d) a method in which a dispersion prepared by dispersing the core particles or a powder of the composite in the acidic aqueous solution is sprayed onto a surface of a solid that functions as the Cu electrode and that is formed Cu or a Cu alloy.

* * * * *